(12) United States Patent
Curran-Gray et al.

(10) Patent No.: US 7,746,949 B2
(45) Date of Patent: Jun. 29, 2010

(54) COMMUNICATIONS APPARATUS, SYSTEM AND METHOD OF CREATING A SUB-CHANNEL

(75) Inventors: Martin Curran-Gray, Fife (GB); Lance Tatman, Granite Bay, CA (US); Slawomir K. Ilnicki, Los Altos Hills, CA (US); Andrew Lehane, Kinross-shire (GB)

(73) Assignee: JDS Uniphase Corporation, Milpitas, CA (US)

( * ) Notice: Subject to any disclaimer, the term of this patent is extended or adjusted under 35 U.S.C. 154(b) by 1122 days.

(21) Appl. No.: 11/394,750

(22) Filed: Mar. 31, 2006

(65) Prior Publication Data

US 2007/0230550 A1    Oct. 4, 2007

(51) Int. Cl.
*H04B 7/02* (2006.01)

(52) U.S. Cl. .................. 375/267; 375/299; 375/338; 370/225; 370/242

(58) Field of Classification Search .................. 375/260, 375/267, 299, 338, 346, 347; 370/217, 221–228, 370/241, 242–246, 248, 249, 252
See application file for complete search history.

(56) References Cited

U.S. PATENT DOCUMENTS

| 6,424,627 | B1 * | 7/2002 | Sørhaug et al. | 370/241 |
| 2002/0029293 | A1 * | 3/2002 | Chakravarthi et al. | 709/249 |

FOREIGN PATENT DOCUMENTS

EP    1 524 807 A1    4/2005

* cited by examiner

*Primary Examiner*—Kevin Y Kim
(74) *Attorney, Agent, or Firm*—Matthew A. Pequignot; Pequignot + Myers LLC

(57) ABSTRACT

A communications apparatus is capable of being disposed in-line in a communications link that supports a main communications channel. The communications link connects a first host to a second host. The communications apparatus comprises an application logic that supports a sub-channel within the main channel. When the main channel is potentially faulty, the application logic is arranged to monitor the main channel to determine an error condition and send a message by replacing data reserved for control purposes in order to communicate the error condition as sub-channel data.

18 Claims, 2 Drawing Sheets

COMMUNICATIONS APPARATUS, SYSTEM AND METHOD OF CREATING A SUB-CHANNEL

The present invention relates to a communications apparatus of the type, for example, that is capable of creating a sub-channel in a main channel supported between a first network node and a second network node. The present invention also relates to a communications system of the type, for example, comprising a first network node and a second network node capable of supporting a main channel therebetween and a sub-channel within the main channel. The present invention further relates to a method of creating a sub-channel of the type, for example, in a main channel supported between a first network node and a second network node.

BACKGROUND ART

In the field of network communications, network elements, for example routers, are provided to create communications links between routers separated by a physical distance, such as between domains. The network elements also have to be replaced from time-to-time.

In order to assist configuration of such network elements after physical installation, automatic configuration techniques have been implemented in the network elements to simplify configuration of the network elements. For example, Ethernet routers, operating in accordance with the Institute of Electrical and Electronic Engineers (EEEI) 802.3 standard, are able to perform a so-called auto-negotiation process.

Consequently, in respect of an optical Gigabit Ethernet link established between a pair of Gigabit Ethernet capable hosts that both support auto-negotiation, respective Physical Conversion Sub-layers (PCSs) of the two hosts use the link to establish their respective operational credentials after power-up and before normal communication is performed by the hosts. In this respect, special reserved code words are used by each PCS to indicate to each other the contents of various respective registers, thereby providing each other with information concerning their respective capabilities. In effect, each PCS advertises to its counterpart its respective capabilities. The register used is known as an "Advertisement register", contents of the "Advertisement register" that a first Ethernet host receives from a second Ethernet host, at an opposite end of the communications link, are placed into a similarly sized local register by the first Ethernet host, known as a "Link Partner Ability" register".

During expected operation, each host compares the contents of the locally stored Advertisement register with the Link Partner Ability register, and by following a set of simple rules, each PCS determines a common mode of operation achievable by both PCSs. A resolved set of operational characteristics is then sent back by each PCS to the other so that each PCS can "see" what the opposing end has determined as the common mode of operation. If both PCSs arrive at the same common mode of operation, and after a brief pause, the first and second Ethernet PCSs then offer their services to their respective higher protocol stack layers based upon the agreed common mode of operation, and normal communication then takes place between the first and second Ethernet hosts. On the other hand, if the common mode of operation cannot be agreed, the PCSs revert to exchanging the Advertisement registers again, implying a disagreement between the first and second Ethernet PCSs as to the proposed common mode of operation and a desire to re-start the auto-negotiation process.

However, since its inception, the auto-negotiation process used on Gigabit Ethernet links has proved problematic: problems have been found in various optical products produced by various vendors. System administrators have therefore been known to disable the auto-negotiation feature of networking devices when installing the devices, preferring manual configuration, which while taking more time and effort to configure, usually works more reliably. The benefits of having the auto-negotiation feature for gigabit Ethernet capable equipment are therefore lost. Consequently, if one of the networking devices in the communications link is replaced, a new unit has to be configured manually with exactly the same configuration of its counterpart device at the other end of the link. Whilst configuration parameters for optical Gigabit Ethernet are not too numerous, mistakes can still be made when configuring devices, leading to a link that does not operate correctly.

In order to facilitate the auto-negotiation process a so-called "Internet Advisor" unit having a so-called Gigabit Ethernet "Under-cradle" module is available from Agilent Technologies, Inc. and can be installed in the communications link. The Internet Advisor unit is primarily a Protocol analyser for capturing, displaying, and analysing messages that flow over the communications link. However, the Internet Advisor also has a secondary mode for capturing auto-negotiation messages that take place on a Gigabit Ethernet system link, allowing the systems administrator to diagnose any problems that can prevent normal communication taking place between nodes using the communication link.

Whilst useful as a protocol analyser, the Internet Advisor is bulky and requires a dedicated AC power supply, and a site to locate it during operation; space to site the Internet Advisor is not always easy to find in an already full equipment room containing many racks and closets of networking equipment. Additionally, it is necessary to re-route original optical fibres to connect the Internet Advisor unit into the communications link and a new pair of optical fibres also needs to be connected to provide the Internet Advisor with optical signals. Once any problem has been diagnosed and the communications link has been established and running, the Internet Advisor unit then has to be disconnected, the original optical fibre cabling re-established, and auto-negotiation has to take place once more.

DISCLOSURE OF INVENTION

According to a first aspect of the present invention, there is provided a communications apparatus for communicating sub-channel data using a potentially faulty first main channel and a potentially faulty second main channel between a first network node and a second network node, the apparatus comprising: a data store for temporarily storing sub-channel data; a processing resource capable of supporting, when in use, a monitor module and a diagnostic module; wherein the monitor module is arranged to monitor first data for communication between the first network node and the second network node; the diagnostic module is arranged to use at least part of the monitored first data to generate diagnostic data for identifying an operational status of at least one of the potentially faulty first and second main channels, the sub-channel data comprising the diagnostic data; and the processing resource is arranged to intervene in communication of second data communicated on at least one of the first and second channels in order to provide at least temporarily a suitable channel condition on at least one of the first and second main channels for initiating transmission of the sub-channel data.

The second data may be communicated subsequent to the first data. The first data may have a reserved status for control of at least one of the potentially faulty first and second main channels.

At least part of the second data may have a reserved status for control of at least one of the potentially faulty first and second main channels, and the processing resource may be further arranged to identify the second data, and to send the sub-channel data in place of the at least part of the second data.

The at least part of the second data may correspond to a duration that is at least a predetermined suitable minimum duration to support the initiation of transmission of the sub-channel data.

The processing resource may be arranged to determine first control data for establishing at least one of the first and second main channels, and to send the first control data to the first network node.

The processing resources may be arranged to suppress temporarily control data and/or non-control data sent by the second network node, thereby preventing interference with the first control data.

The processing resource may be arranged to participate in an auto-negotiation procedure with the first network node on behalf of the second network node.

The processing resource may be arranged to determine second control data for establishing at least one of the first and second main channels, and to send the second control data to the second network node.

The processing resource may be arranged to suppress temporarily control data and/or non-control data sent by the first network node, thereby preventing interference with the second control data.

The processing resource may be arranged to participate in an auto-negotiation procedure with the second network node on behalf of the first network node.

The processing resource may be arranged to replace temporarily the second network node and establish communications with the first network node in order to send the sub-channel data.

The processing resource may be arranged to replace temporarily the first network node and establish communications with the second network node in order to send the sub-channel data.

The processing resource may be arranged to support a communications protocol state machine.

The communications protocol state machine may be an auto-negotiation state machine.

Any of the control data may be control characters. The first data and/or the second data may be signaling data.

The second data may be idle data.

The diagnostic data may comprise data associated with a fault condition.

The main channel may be bi-directional. The apparatus may comprise a first sub-channel injector arranged to support the sending of the sub-channel data. The apparatus may also comprise a second sub-channel injector.

The first network node may be manually configured and the second network node may be manually configured or support automatic configuration. Alternatively, the first network node may support automatic configuration and the second network node may be manually configured or support automatic configuration.

The processing resource may be arranged to buffer communications between the first network node and the second network node in order to compensate for duplex mismatch.

The processing resource may be arranged to compensate for a configuration incompatibility between the first network node and the second network node.

The apparatus may further comprise: memory operable to hold an extra packet constituting the sub-channel data; memory operable to hold a parallel datastream while the extra packet is being sent; and control logic for controlling transmission of the sub-channel data in place of the at least part of the second data.

The apparatus may comprise a deserialiser operable to convert a serial datastream to the parallel datastream for the downstream communications on the main channel, and a serialiser operable to convert the parallel datastream back to the serial datastream.

According to a second aspect of the present invention, there is provided a method of communicating sub-channel data using a potentially faulty first main channel and a potentially faulty second main channel between a first network node and a second network node, the method comprising: monitoring first data for communication between the first network node and the second network node; using at least part of the monitored first data to generate diagnostic data for identifying an operational status of at least one of the potentially faulty first and second main channels; temporarily storing sub-channel data, the sub-channel data comprising the diagnostic data; and intervening in communication of second data communicated on the at least one of the first and second channels in order to provide at least temporarily a suitable channel condition on the at least one of the first and second main channels for initiating transmission of the sub-channel data.

According to a third aspect of the present invention, there is provided a computer program element comprising computer program code means to make a computer execute the method as set forth in accordance with the second aspect of the invention.

The computer program code element may be embodied on a computer readable medium.

According to a third aspect of the present invention, there is provided a communications system, comprising: a first network node capable of communicating with a second network node and supporting a first main channel and a second main channel therebetween, the first and second main channels being potentially faulty; and a network monitoring apparatus for communicating sub-channel data using at least one of the potentially faulty first and second main channels, the apparatus comprising a data store for temporarily storing sub-channel data, and a processing resource capable of supporting a monitor module and a diagnostic module; wherein the monitor module is arranged to monitor, when in use, first data for communication between the first network node and the second network node; the diagnostic module is arranged to use, when in use, at least part of the monitored first data to generate diagnostic data for identifying an operational status of at least one of the potentially faulty first and second main channels, the sub-channel data comprising the diagnostic data; and the processing resource is arranged to intervene, when in use, in communication of second data communicated on the at least one of the first and second channels in order to provide at least temporarily a suitable channel condition on the at least one of the first and second main channels for initiating transmission of the sub-channel data.

It is thus possible to provide an apparatus, system and method that are capable of communicating error conditions to a central monitoring station prior to correct functioning of a main communications channel. In some circumstances, it is also possible to assist with establishment of a communications link and/or compensate for errors in configuration of network nodes. Additionally, the apparatus is economic with respect to physical space requirements and can be incorporated into or coupled to an existing network device.

BRIEF DESCRIPTION OF DRAWINGS

At least one embodiment of the invention will now be described, by way of example only, with reference to the accompanying drawings, in which.

DETAILED DESCRIPTION

Figure 1:
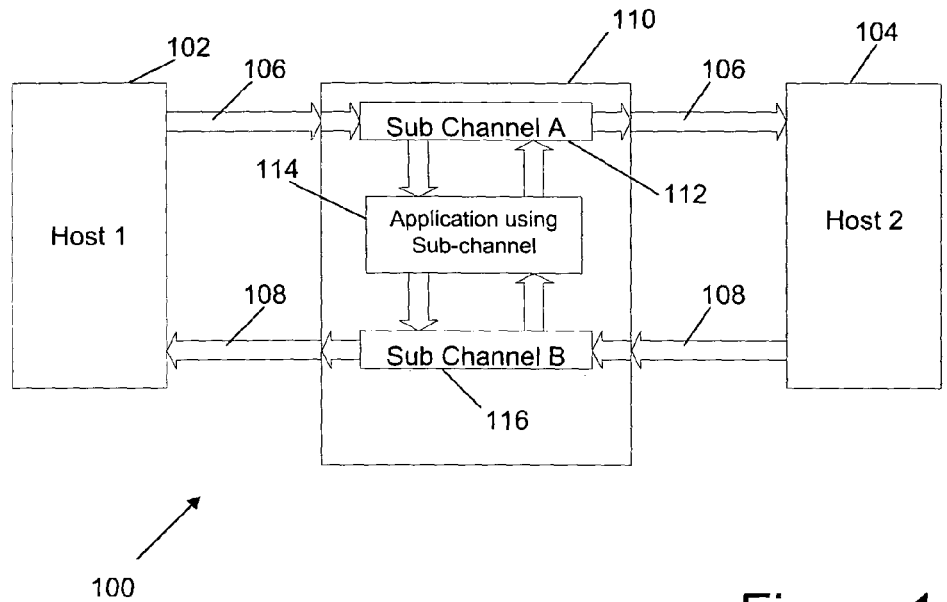
FIG. 1 is a schematic diagram of a communications system comprising a communications apparatus constituting an embodiment of the invention.

Throughout the following description identical reference numerals will be used to identify like parts.

Referring to FIG. 1, a communications system 100 comprises a first network node, for example a first host 102 capable of communicating with a second network node, for example a second host 104. The first host 102 is therefore coupled to the second host 104 by a first unidirectional communications link 106 in a first direction and a second unidirectional communications link 108 in a second direction opposite to the first direction, thereby providing communications media for bi-directional communications between the first and second hosts 102, 104. In this example, the first host 102 is a first router and the second host 104 is a second router, the first and second routers together providing connectivity between domains (not shown) in a communications network (also not shown). However, the skilled person will appreciate that the first and second hosts 102, 104 can be other functional pairs of communications elements, for example an Ethernet card in a Personal Computer and a router, respectively.

The first and second unidirectional communications links 106, 108 are each supported, in this example, by a respective optical fibre. A first main communications channel is supported by the first unidirectional communications link 106 and a second main communications channel is supported by the second unidirectional communications link 108.

In order to support a first sub-channel in the first main channel, and a second sub-channel in the second main channel, an in-line sub-channel apparatus 110 of the type described in EP-A1-1 524 807 is disposed in the first and second communications links 106, 108 between the first and second hosts 102, 104. Although the structure and operation of the in-line sub-channel apparatus 110 is well-documented in EP-A1-1 524 807, for the sake of ease of reference and ready understanding of the additional and/or alternative functionality described later herein, the structure of the in-line sub-channel apparatus 110 will now be briefly described.

The in-line sub-channel apparatus 110 comprises a first sub-channel injector 112 coupled to an application logic 114 that uses the first sub-channel supported by the first sub-channel injector 112. The application logic 114 serves as a processing resource. In contrast with EP-A1-1 524 807, the in-line sub-channel apparatus 110 also comprises a second sub-channel injector 116 coupled to the application logic 114 as the application logic 114 also uses, in this example, the second sub-channel supported by the second sub-channel injector 116. Since the second sub-channel injector 116 is a reverse-direction implementation of the first sub-channel injector 112, the second sub-channel injector 116 will not be described in further detail herein, since the skilled person will appreciate the structure and function of the second sub-channel injector 116 from a description of the first sub-channel injector 112.

Figure 2:
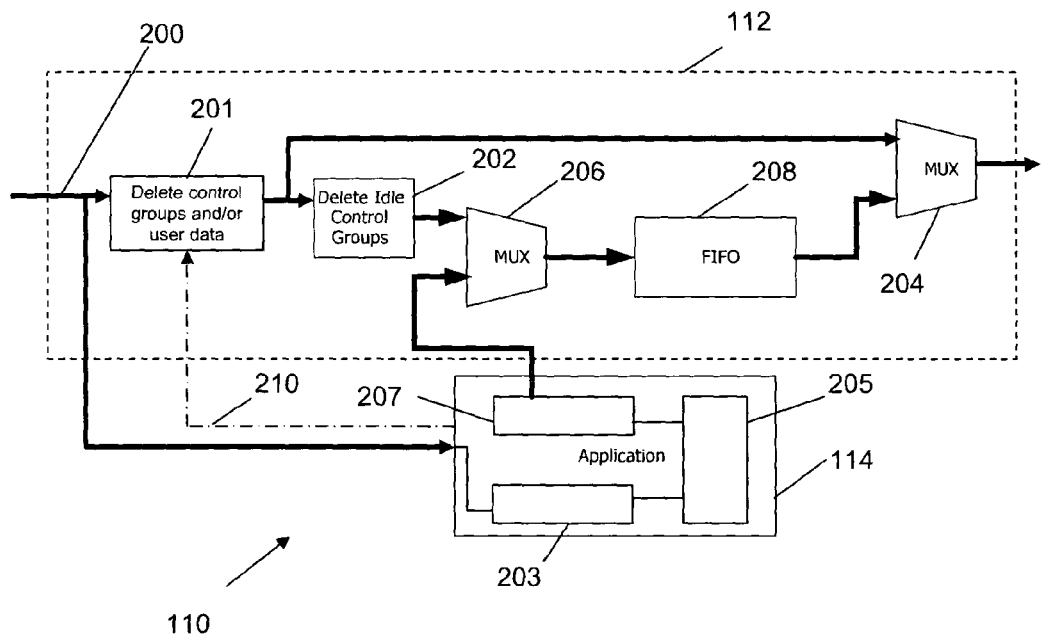
FIG. 2 is a schematic diagram of the communications apparatus of FIG. 1 in greater detail.

Turning to FIG. 2, the application logic 114 supports a monitor module 203 capable of communicating with a diagnostic module 205. The monitor module 203 is coupled to a datastream input 200 of the first sub-channel injector 112. The datastream input 200 is also coupled to an input of a data deletion module 201, an output of the data deletion module 201 being coupled to an input of an idle deletion module 202 and a first input of a first multiplexer 204. An output of the idle deletion module 202 is coupled to a first input of a second multiplexer 206, a second input of the second multiplexer 206 being coupled to an internal buffer 207 of the application logic 114. The internal buffer 207 is also coupled to the diagnostic module 205. An output of the second multiplexer 206 is coupled to an input of a First-In-First-Out (FIFO) buffer 208, an output of the FIFO buffer 208 being coupled to a second input of the first multiplexer 204.

A control line 210 is coupled between the application logic 114 and the data deletion module 201.

Although not shown and not required if data is to be processed in parallel, a de-serialiser module is coupled before the datastream input 200 to perform a serial-to-parallel conversion on incoming data arriving at the first sub-channel injector 112 and a serialiser module is coupled to an output of the first multiplexer 204 to perform a parallel-to-serial conversion on outgoing data leaving the first sub-channel injector 112.

In operation, the communications system 100 supports a Gigabit Ethernet protocol in accordance with the Institute of Electrical and Electronic Engineers (IEEE) standard 802.3 and the in-line sub-channel apparatus 110 is capable of functioning in a manner described in EP-A1-1 524 807. However, the skilled person will recognise that the functionality of the in-line sub-channel apparatus 110 can be modified to include only some of the functionality described in EP-A1-1 524 807. Likewise, in the present example, the functionality of the in-line sub-channel apparatus 110 has been enhanced.

In this example, the in-line sub-channel apparatus 110 is part of a communications monitoring apparatus (not shown), for example a probe, such as any suitable probe for measuring network performance, that generates measurement data in relation to given communications links, for example the first unidirectional communications link 106 and the second unidirectional communications link 108. Typically, the sub-channel is supported by the in-line sub-channel apparatus 110 to communicate the measurement data generated to a central monitoring station for analysis in order to monitor Quality of Service, inter alia, in the communications system 100 and diagnose any faults.

When the first host 102 does not need to communicate with the second host 104, the first host 102, instead of simply remaining inactive during an idle period, sends data signifying the idle period in the datastream to the second host 104. As described in EP-A1-1 524 807, the in-line sub-channel apparatus 110 exploits idle periods on the first main channel to support the first sub-channel. In an analogous manner, the in-line sub-channel apparatus 110 also exploits idle periods on the second main channel to support the second sub-channel.

Whilst the above performance is true once the first and second unidirectional links 106, 108 have been established, in some circumstances, associated with configuration of the first host 102 and/or the second host 104, error conditions arise, sometimes prior to the establishment of the links 106, 108. A number of causes can be responsible for different error conditions and in order to ensure efficient communications, or indeed any communications, between the first host 102 and the second host 104, it is necessary to report such error conditions to a central monitoring station (not shown). It is therefore desirable to use the first sub-channel and/or the second sub-channel to support communication of the error conditions.

Figure 3:
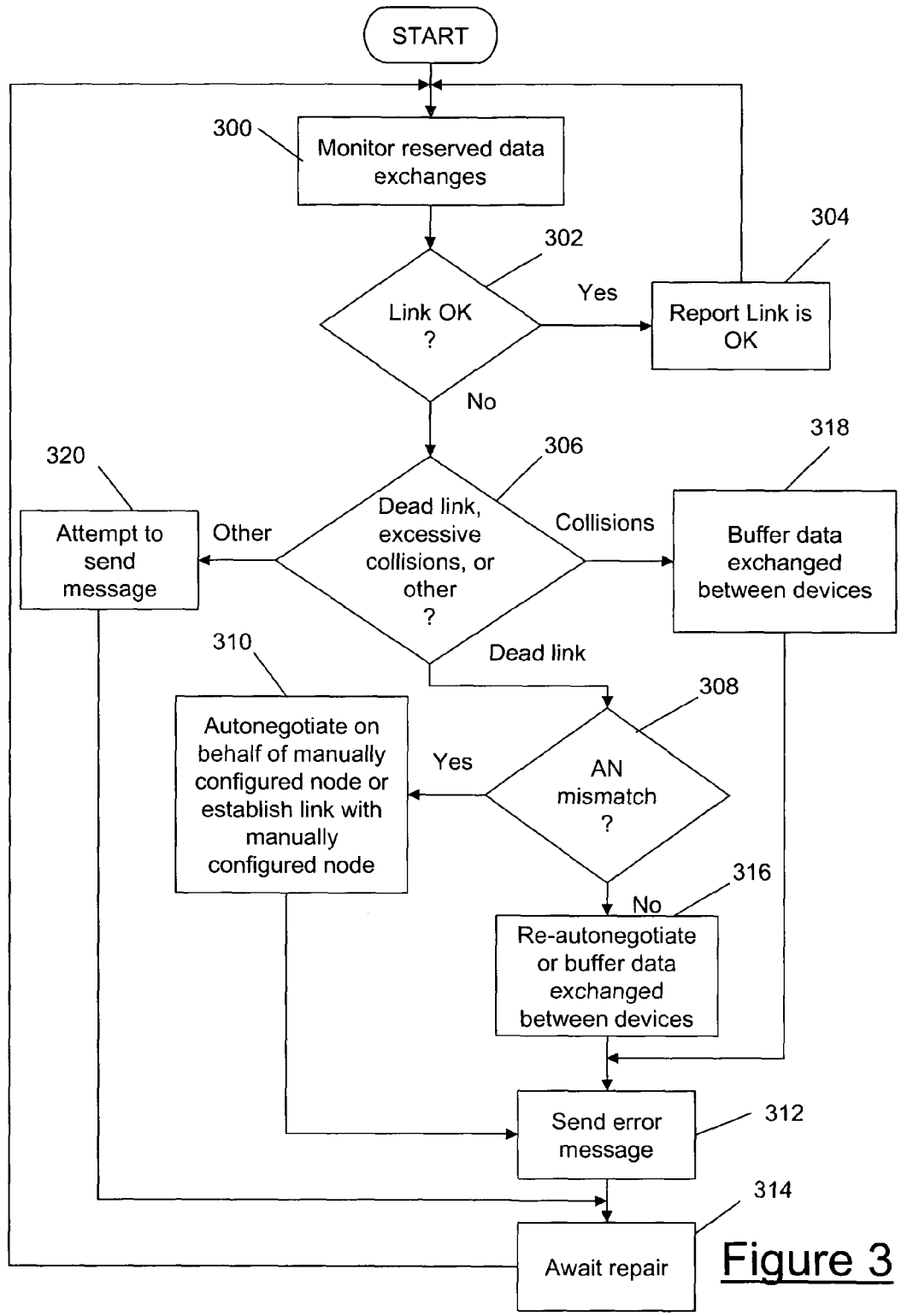
FIG. 3 is a flow diagram of a method employed by the communications apparatus of FIGS. 1 and 2.

Turning to FIG. 3, the monitor module 203 of the application logic 114 therefore monitors (300) communications between the first host 102 and the second host 104 via the datastream input 200. The monitoring predominantly, but not exclusively, takes place during one or more attempts to establish the first and second unidirectional links 106, 108 (hereinafter referred to as the communications link). In order to monitor the establishment of the communications link, the application logic 114 monitors for reserved codes communicated between the first host 102 and the second host 104 when trying to establish the communications link. The monitor module 203 of the application logic 114 also monitors (300) communications patterns between the first host 102 and the second host 104. The application logic 114 performs the above-described monitoring in order to determine (302), using the diagnostic module 205, if an error condition exists in relation to the communications link and, in particular, the first and second main channels.

In the event that the diagnostic module 205 of the application logic 114 does not detect any error conditions in relation to the first and second main channels, the diagnostic module 205 of the application data generates a message that is stored in the internal buffer 207, the message indicating that the communications link is operating within expected operating parameters and the in-line sub-channel apparatus 110 sends (304) the message to the central monitoring station in accordance with operational constraints described in EP-A1-1 524 807 relating to disruption of the first main channel or the second main channel.

In the alternative, an error condition is detected (302) by the application logic 114 in relation to the first and/or second main channels. A number of exemplary error conditions and procedures to report the error conditions are set out below.

As an initial diagnostic operation, the application logic 114 determines (306) whether the communications link in able to support any traffic, for example data frames, is experiencing excessive collusions of data frames or is experiencing other poor performance.

1. Auto-negotiation Mismatch

In the event that the communications link is unable to support any traffic ("Dead link" in FIG. 3), the application logic 114 attempts to determine (308) whether an auto-negotiation mismatch exists. If the first host 102 is capable of performing auto-negotiation and this feature is enabled, and the second host 104 is set to be configured manually, then the auto-negotiation mismatch exists. Likewise, if the first host 102 is set to be configured manually, but the second host 104 is set to use the auto-negotiation feature, the auto-negotiation mismatch also exists.

The application logic 114 is able to detect the auto-negotiation mismatch, because one of the first host 102 and the second host 104 sends Advertisement register data to the other and the other does not send Advertisement register data. In such circumstances, the application logic 114 concludes that the auto-negotiation mismatch exists and generates an error message to communicate this fact, the error message being stored in the internal buffer 207 prior to transmission.

The in-line sub-channel apparatus 110, under the control of the application logic 114, then attempts to establish the first main channel and/or the second main channel in order to be able to communicate the error message stored in the internal buffer 207.

Thereafter, the in-line sub-channel apparatus 110 has two courses of action that it can take. The application logic 114 initially tries to perform the auto-negotiation process by default (310) on behalf of the one of the first and second hosts 102, 104 that has been manually configured. In this example, the second host 104 has been manually configured and so the application logic 114, attempts to establish the first main channel and/or the second main channel by performing the auto-negotiation process on behalf of the second host 104 based upon an assumption that the second host 104 has been configured to a simple configuration. In the event that the auto-negotiation performed by the application logic 114 on behalf of the second host 104 fails, the application logic 114 attempts to establish the first main channel and/or the second main channel by communicating with the one of the first and second hosts 102, 104 that has been manually configured, in this example the second host 104, in a manual fashion, namely performing normal communications again based upon the assumption that the second host 104 has been configured to the simple configuration (310).

Whilst the application logic 114 is attempting to auto-negotiate on behalf of the second host 104, the application logic 114 uses the control line 210 to instruct the data delete module 201 to delete data transmitted by the second host 104. Likewise, whilst the application logic 114 is emulating a manually configured network node to communicate with the second host 104 in place of the first host 102, the application logic 114 uses the control line 210 to instruct the data delete module 201 to delete auto-negotiation control group data transmitted by the first host 102 attempting auto-negotiation.

It should be appreciated that since it is not always possible to establish the first and/or second main channel reliably, the in-line sub-channel apparatus 110 is not restricted simply to replacing data signifying an idle period, but any other type of control data of a reserved status Once the first and/or second main channel has been established, the application logic 114 initiates transmission (312) of the error message using the sub-channel supported by the first or second sub-channel injector 112, 116 in accordance with the method of transmitting sub-channel data described in EP-A1-1 524 807. Thereafter, the in-line sub-channel apparatus 110 awaits (314) rectification of the error condition and then reverts to the above-described monitoring process (300 et seq.).

2. Auto-negotiation in the Presence of Duplex Mismatch

In the event that the application logic 114 determines (308) that the auto-negotiation mismatch does not exist, the application logic 114 infers that the error condition is caused by a duplex mismatch and generates the error message to communicate this fact, the error message again being stored in the internal buffer 207 prior to transmission. The duplex mismatch arises when the auto-negotiation process has failed to negotiate properly a common duplexing mode between the first host 102 and the second host 104. Consequently, one of the first and second hosts 102, 104 is set to a full duplexing mode and another of the first and second hosts 102, 104 is set to a ½ duplexing mode. In this example, the first host 102 is in the full duplexing mode and the second host 104 is in the ½ duplexing mode.

In such circumstances, the in-line sub-channel apparatus 110, under the control of the application logic 114, attempts to reinitiate the auto-negotiation (316) between the first and second hosts 102, 104 and manipulate the repeated auto-negotiation process to avoid the previously-described duplex mismatch, thereby establishing the first main channel and/or the second main channel. Alternatively, in the event the re-initiated auto-negotiation process fails to resolve the duplex mismatch, the application logic 114 attempts to establish the first main channel and/or the second main channel by acting as a data buffer to handle the data flow mismatch between the first and second hosts 102, 104 operating in different duplex modes.

Again, whilst the application logic 114 is attempting to manipulate the re-initiated auto-negotiation process, the application logic 114 uses the control line 210 to instruct the data delete module 201 to delete inappropriate control data received and that may require replacement with alternative control data.

It should be appreciated that since it is not always possible to establish the first and/or second main channel reliably, the in-line sub-channel apparatus 110 is not restricted simply to replacing data signifying an idle period, but any other type of control data of a reserved status.

Once the first and/or second main channel has been established, the application logic 114 then initiates transmission (312) of the error message using the sub-channel supported by the first or second sub-channel injector 112, 116 in accordance with the method of transmitting sub-channel data described in EP-A1-1 524 807. Thereafter, the in-line sub-channel apparatus 110 awaits (314) resolution of the error condition and then reverts to the above-described monitoring process (300 et seq.).

3. Manual Configuration in the Presence of Duplex Mismatch

The first host 102 and the second host 104 have been manually configured, but one of the first host 102 and the second host 104 is set to the full duplex mode and another of the first host and the second host 104 is set to the ½ duplex mode. In this example, the first host 102 is in the full duplex mode and the second host 104 is in the ½ duplex mode. Some functionality of the first and second unidirectional links 106, 108 is, in this example, achieved but an excessive number of collisions is present on the first and/or second unidirectional link 106, 108.

In order to determine (306) that the first and second hosts 102, 104 have been manually configured but suffer from duplex mismatch, the application logic 114 ascertains, from the monitored communications between the first and second hosts 102, 104, the existence of one or more of the following behaviours.

Firstly, the second host 104, operating in the ½ duplex mode, does not transmit beyond a given point in time (corresponding to a number of bits) into a transmission from the first host 102, operating in the full duplex mode. Secondly, the second host 104 abandons transmissions initiated shortly after initiation of a subsequent transmission by the first host 102, since the second host 104 has inferred that a collision has taken place. Thirdly, the second host 104 aborts transmissions for no apparent reason if the first host 102 starts transmitting after the given point in time during transmission by the second host 104; the second host 104 has inferred that a collision or a so-called late collision has taken place since the first host 102, by virtue of implementation the full duplex mode, is ignoring carrier sense collision detect rules set out in the IEEE 802.3 standard.

In the event that the duplex mismatch is detected by the application logic 114, the application logic 114 generates the error message to communicate this fact, the error message again being stored in the internal buffer 207 prior to transmission. The application logic 114 also attempts to establish the first main channel and/or the second main channel by acting as a data buffer to handle the data flow mismatch between the first and second hosts 102, 104 operating in the different duplex modes.

It should be appreciated that since it is not always possible to establish the first and/or second main channel reliably, the in-line sub-channel apparatus 110 is not restricted simply to replacing data signifying an idle period, but any other type of control data of a reserved status.

Once the first and/or second main channel has been established, the application logic 114 then initiates transmission (312) of the error message using the sub-channel supported by the first or second sub-channel injector 112, 116 in accordance with the method of transmitting sub-channel data described in EP-A1-1 524 807. Thereafter, the in-line sub-channel apparatus 110 awaits (314) resolution of the error condition and then reverts to the above-described monitoring process (300 et seq.).

4. Poor Performance

In the event that the first and second hosts 102, 104 have completed the auto-negotiation process, but one of the first and second hosts 102, 104 has mis-advertised to another of the first and second hosts 102, 104 a behaviour as compared with a functionality currently supported, poor performance of the communications link results. Alternatively, the first and second hosts 102, 104 can each be manually configured, one or both of the first and second hosts 102, 104 having been mis-configured. In this example, the first host 102 therefore supports flow control, but the second host 104 does not support flow control.

In order to detect (306) the poor performance that results from the above incorrect configuration (either manual or automatic), the application logic 114 monitors, in particular, Media Access Control (MAC) frames, for example PAUSE requests, communicated between the first and second hosts 102, 104 in accordance with the IEEE 802.3 standard during the monitoring (300) of the communications between the first and second hosts 102, 104. Typically, a PAUSE request transmitted by the first host 102 is ignored by the second host 104 when the above mis-configuration exists and the second host 104 continues to transmit new frames during a count-down period of a pause count-down timer (not shown) of the first host 102. Upon detection of the cause of the poor performance, the application logic 114 generates the error message to communicate this fact, the error message being stored in the internal buffer 207 prior to transmission.

Once the first and/or second main channel has been established, the application logic 114 then initiates transmission (312) of the error message using the sub-channel supported by the first or second sub-channel injector 112, 116 in accordance with the method of transmitting sub-channel data described in EP-A1-1 524 807. Due to the erratic nature of the first and/or second main channel, the in-line sub-channel apparatus 110 is not restricted simply to replacing data signifying an idle period, but any other type of control data of a reserved status. In some embodiments, it can be desirable to delete any traffic on the first and/or second main channel in order to provide one or more opportunity to send the sub-channel data. Thereafter, the in-line sub-channel apparatus 110 awaits (314) resolution of the error condition and then reverts to the above-described monitoring process (300 et seq.).

In the above examples, the first and/or second main channels are potentially faulty. It should be appreciated, however, that non-function of one or both of the first and/or second main channels does not result in the first and/or second unidirectional links 106, 108 not supporting the first and/or second main channels, respectively. In this respect, the first and/or second channel is not considered to cease to exist, but rather one or both are potentially faulty.

Although the above examples have been described in the context of packet communications, it should be appreciated that the term "message" is intended to the construed as embracing packets, datagrams, frames, cells and/or protocol data units and so these terms should be understood to be interchangeable. Therefore, in the context as described herein, it should be understood that a "packet" is not just an IP packet but it is a frame that can contain an IP packet. In the case of Ethernet, it is an Ethernet frame that may already be encoded, for example using 8B/10B encoding. The type of encoding will depend on encoding techniques used by passing traffic.

Whilst it has been suggested above that the in-line sub-channel apparatus is implemented in a probe, the skilled person will appreciate that the in-line sub-channel apparatus can be implemented in various forms, for example in a highly integrated form suitable for replacing industry-standard interface converter modules, for example those known as GigaBit Interface Converters (GBICs). Current GBICs are effectively transceivers that translate signals of one media type, for example optical or electrical, to another media type. By providing a replacement GBIC including the in-line sub-channel apparatus, numerous applications requiring sub-channels are further enabled.

Alternative embodiments of the invention can be implemented as a computer program product for use with a computer system, the computer program product being, for example, a series of computer instructions stored on a tangible data recording medium, such as a diskette, CD-ROM, ROM, or fixed disk. The series of computer instructions can constitute all or part of the functionality described above, and can also be stored in any memory device, volatile or non-volatile, such as semiconductor, magnetic, optical or other memory device.

What is claimed is:

1. A communications apparatus for communicating sub-channel data using at least one of a potentially faulty first main channel and a potentially faulty second main channel between a first network node and a second network node, the apparatus comprising:
   a data store for temporarily storing sub-channel data;
   a processing resource capable of supporting, when in use, a monitor module and a diagnostic module; wherein
   the monitor module is arranged to monitor first data for communication between the first network node and the second network node;
   the diagnostic module is arranged to use at least part of the monitored first data to generate diagnostic data for identifying an operational status of at least one of the potentially faulty first and second main channels, the sub-channel data comprising the diagnostic data; and
   the processing resource is arranged to operate on behalf of at least one of the first network nodeand the second network node and intervene in communication of second data communicated on at least one of the first and second channels in order to provide at least temporarily a suitable channel condition on at least one of the first and second main channels for initiating transmission of the sub-channel data,
   wherein at least part of the second data has a reserved status for control of at least one of the potentially faulty first and second main channels, the processing resource being further arranged to identity the second data, and to send the sub-channel data in place of the at least part of the second data.

2. The apparatus as claimed in claim 1, wherein the at least part of the second data corresponds to a duration that is at least a predetermined suitable minimum duration to support the initiation of transmission of the sub-channel data.

3. The apparatus as claimed in claim 1, wherein the processing resource is arranged to determine first control data for establishing at least one of the first and second main channels, and to send the first control data to the first network node.

4. The apparatus as claimed in claim 3, wherein the processing resources is arranged to suppress temporarily control data and/or non-control data sent by the second network node, thereby preventing interference with the first control data.

5. The apparatus as claimed in claim 1, wherein the processing resource is arranged to participate in an auto-negotiation procedure with the first network node on behalf of the second network node.

6. The apparatus as claimed in claim 1, wherein the processing resource is arranged to determine second control data for establishing at least one of the first and second main channels, and to send the second control data to the second network node.

7. The apparatus as claimed in claim 6, wherein the processing resource is arranged to suppress temporarily control data and/or non-control data sent by the first network node, thereby preventing interference with the second control data.

8. The apparatus as claimed in claim 6, wherein the processing resource is arranged to participate in an auto-negotiation procedure with the second network node on behalf of the first network node.

9. The apparatus as claimed in claim 1, wherein the processing resource is arranged to replace temporarily the second network node and establish communications with the first network node in order to send the sub-channel data.

10. The apparatus as claimed claim 1, wherein the processing resource is arranged to replace temporarily the first network node and establish communications with the second network node in order to send the sub-channel data.

11. The apparatus as claimed in claim 1, wherein the second data is idle data.

12. The apparatus as claimed in claim 1, wherein the diagnostic data comprises data associated with a fault condition.

13. The apparatus as claimed in claim 1, wherein the processing resource is arranged to buffer communications between the first network node and the second network node in order to compensate for duplex mismatch.

14. The apparatus as claimed in claim 1, wherein the processing resource is arranged to compensate for a configuration incompatibility between the first network node and the second network node.

15. The apparatus as claimed in claim 1, further comprising:
   memory operable to hold an extra packet constituting the sub-channel data;
   memory operable to hold a parallel datastream while the extra packet is being sent; and
   control logic for controlling transmission of the sub-channel data in place of the at least part of the second data.

16. A method of communicating sub-channel data using at least one of a potentially faulty first main channel and a potentially faulty second main channel between a first network node and a second network node, the method comprising:
   monitoring first data for communication between the first network node and the second network node;

using at least part of the monitored first data to generate diagnostic data for identifying an operational status of at least one of the potentially faulty first and second main channels;

temporarily storing sub-channel data, the sub-channel data comprising the diagnostic data; and operating on behalf of at least one of the first network nodeand the second network nodeintervening in communication of second data communicated on the at least one of the first and second channels in order to provide at least temporarily a suitable channel condition on the at least one of the first and second main channels for initiating transmission of the sub-channel data, wherein at least part of the second data has a reserved status for control of at least one of the potentially faulty first and second main channels, the processing resource being further arranged to identity the second data, and to send the sub-channel data in place of the at least part of the second data.

17. A computer program element comprising computer program code means to make a computer execute the method of claim 16.

18. A communications system, comprising:

a first network node capable of communicating with a second network node and supporting a first main channel and a second main channel therebetween, the first and second main channels being potentially faulty; and a network monitoring apparatus for communicating sub-channel data using at least one of the potentially faulty first and second main channels, the apparatus comprising a data store for temporarily storing sub-channel data, and a processing resource capable of supporting a monitor module and a diagnostic module; wherein the monitor module is arranged to monitor, when in use, first data for communication between the first network node and the second network node;

the diagnostic module is arranged to use, when in use, at least part of the monitored first data to generate diagnostic data for identifying an operational status of at least one of the potentially faulty first and second main channels, the sub-channel data comprising the diagnostic data; and the processing resource is arranged to operate on behalf of at least one of the first network nodeand the second network nodeintervene, when in use, in communication of second data communicated on the at least one of the first and second channels in order to provide at least temporarily a suitable channel condition on the at least one of the first and second main channels for initiating transmission of the sub-channel data, wherein at least part of the second data has a reserved status for control of at least one of the potentially faulty first and second main channels, the processing resource being further arranged to identity the second data, and to send the sub-channel data in place of the at least part of the second data.

* * * * *